(12) United States Patent
Breznik et al.

(10) Patent No.: US 7,198,027 B1
(45) Date of Patent: Apr. 3, 2007

(54) LOW SPEED COMBUSTION AIR BYPASS TUBE

(75) Inventors: Evelyn A. Breznik, Waukegan, IL (US); Peter E. Lucier, Chicago, IL (US); Mark C. Noble, Pleasant Prairie, WI (US)

(73) Assignee: BRP US Inc., Sturtevant, WI (US)

( * ) Notice: Subject to any disclaimer, the term of this patent is extended or adjusted under 35 U.S.C. 154(b) by 30 days.

(21) Appl. No.: 10/708,076

(22) Filed: Feb. 6, 2004

(51) Int. Cl.
*F02D 9/08* (2006.01)
(52) U.S. Cl. .................................... 123/337; 123/339.1
(58) Field of Classification Search ................ 123/337, 123/339.1, 339.13
See application file for complete search history.

(56) References Cited

U.S. PATENT DOCUMENTS

| 4,111,167 A | 9/1978 | Conley |
| 4,337,742 A * | 7/1982 | Carlson et al. ........ 123/339.17 |
| 4,426,962 A | 1/1984 | Otani et al. |
| 4,501,240 A | 2/1985 | Aono |
| 4,583,511 A | 4/1986 | Greene |
| 4,790,178 A | 12/1988 | Usui et al. |
| 5,394,846 A * | 3/1995 | Jaeger et al. ............... 123/336 |
| 6,065,447 A | 5/2000 | Saeki et al. |
| 6,502,397 B1 | 1/2003 | Lundqvist |
| 6,539,917 B2 * | 4/2003 | Shaw et al. .............. 123/339.1 |
| 6,647,956 B1 * | 11/2003 | Sharpton .................. 123/339.1 |
| 6,834,637 B1 * | 12/2004 | Sharpton .................... 123/337 |

\* cited by examiner

*Primary Examiner*—Erick R. Solis
(74) *Attorney, Agent, or Firm*—Osler, Hoskin & Harcourt LLP (57) ABSTRACT

An air intake assembly having a bypass and method of operating an engine are disclosed. The air intake assembly has a first opening having a throttle plate disposed in the opening and configured to control the passage of combustion gas through the opening. A second opening is vented to atmosphere and configured to pass combustion gas through the second opening.

46 Claims, 9 Drawing Sheets

LOW SPEED COMBUSTION AIR BYPASS TUBE

BACKGROUND OF INVENTION

The present invention relates generally to engine air intake assemblies, and more particularly, to an idle air bypass tube for use with engine air intake assemblies.

In general, internal combustion engines include at least one cylinder constructed to receive combustion gases that pass through an air intake opening formed in a throttle body attached to the engine. Typically, the amount of combustion gas provided to the cylinder is partly controlled by the position of a throttle plate. As an operator desires increased output from the engine, the operator advances a throttle actuator which in turn opens the throttle plate thereby providing increased amounts of combustion gas to the cylinders. In addition to mechanically actuating the throttle plate, the throttle actuator also initiates increased fuel supplied to the cylinders. In fuel injected engines, the throttle actuator signals an ECU to increase an amount of fuel supplied to the cylinders by a fuel system and, in carbureted engines, the throttle actuator mechanically provides more fuel to the cylinders. As an operator increases the engine speed from idle, the throttle plate gradually opens an amount that is generally proportional to the operator initiated change in throttle actuator position thereby providing more combustion gas to the cylinders of the engine.

As the throttle plate opens in response to the throttle command, in addition to allowing more combustion gas, or air, to pass into the engine, increased amounts of engine noise are allowed to exit the engine through the throttle body and past the throttle plate. Additionally, some known throttle plates have holes formed therethrough. These holes provide an appropriate amount of combustion gas necessary for idle operation of the engine. Those throttle plates which have holes formed therethrough, may cause a whistling, or chirping sound. Alternatively, the throttle plate is held open to allow sufficient air to pass by to maintain idle speed. Those that are held open generally allow engine noise to pass unobstructed. Combustion noise allowed to exit the engine via the air intake, in addition to any whistling or chirping caused by the throttle plate idle holes, can be a distraction to an otherwise well-performing engine. Additionally, a quieter operating engine that eliminates any noise is generally advantageous.

Previous attempts have been made to reduce the amount of engine noise emitted from the air intake assembly of an engine. Some of these attempts include subjecting the flow of incoming air to a tortuous path through a muffling material positioned over the intake opening of the air intake assembly. Other approaches involve placing a muffling material within a recess formed in a housing positioned about the engine. Air for engine combustion is only allowed to enter the housing by passing through the muffling material. Both of these approaches significantly reduce the movement of air to the air intake assembly, periodically require servicing, such as cleaning or replacement of the muffling material, and add excess cost. Additionally, the muffling materials, as they absorb particulate matter, provide the engine with a variable flow of combustion gas to the engine. This variable flow of combustion gas makes precision engine combustion calibration difficult to initially set and even more difficult to maintain.

It would therefore be desirable to have an engine with a throttle assembly that reduces the amount of noise emitted from the main air intake. To this end, it would be desirable to operate the engine with the throttle plate in a closed position for a range of throttle actuator inputs while providing an unrestricted flow of combustion gas through the throttle assembly and to the engine.

BRIEF DESCRIPTION OF INVENTION

The present invention provides an air intake assembly for an internal combustion engine and method of manufacturing an engine that solves the aforementioned problems. The air intake assembly has a first inlet with a throttle plate rotatably disposed therein. A second inlet is formed in the air intake assembly and provides an unobstructed path for combustion gas from atmosphere into the air intake assembly.

In accordance with one aspect of the present invention, an air intake assembly for an internal combustion engine is disclosed that includes a first inlet, a second inlet, and an outlet formed in a throttle body. A throttle plate is rotatably positioned in the first inlet. The second inlet is unobstructedly open to atmosphere.

According to another aspect of the present invention, a throttle body assembly is disclosed that has a chamber configured to be in fluid communication with an internal combustion engine formed in a housing. The housing has a throttle passage in communication with the chamber. A throttle plate is positioned in the throttle passage and configured to interrupt communication through the throttle passage. A bypass passage is formed in the housing and has an inlet facing towards the internal combustion engine and an outlet located in the chamber so that the bypass passage communicates atmosphere to the chamber.

According to a further aspect of the present invention, an internal combustion engine is disclosed that includes an engine having at least one cylinder formed therein. A throttle body is attached to the engine and has a first passage and a second passage. The first passage has a valve therein and is configured to have a variable cross-section. The second passage is vented to atmosphere and has a fixed cross-section.

In accordance with yet another aspect of the present invention, a method of manufacturing an engine is disclosed. The method includes the steps of forming an air inlet opening in one side of a throttle body, positioning a solid surface throttle plate in the air inlet opening, and forming a bypass to atmosphere in another side of the throttle body.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
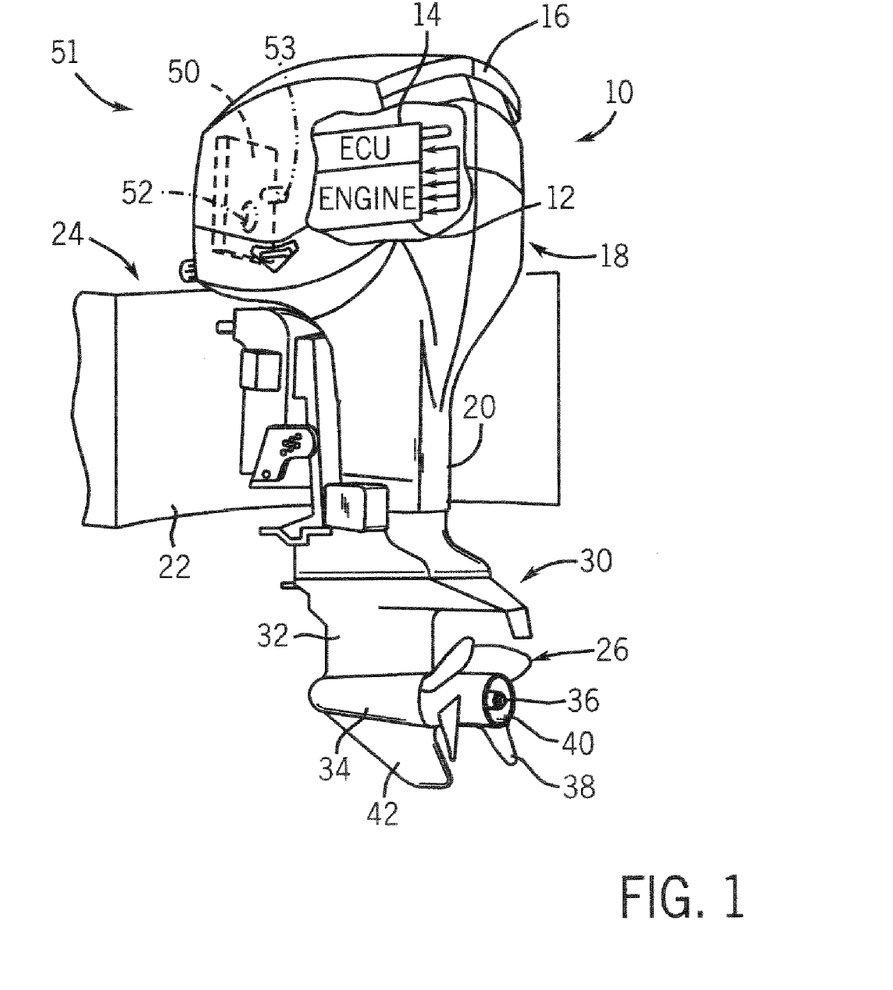
FIG. 1 is a perspective view of an exemplary outboard motor incorporating the present invention.

The present invention relates generally to internal combustion engines. In the present embodiment, the engine is a direct fuel injected, spark-ignited two-cycle gasoline-type engine. FIG. 1 shows an outboard motor 10 having one such engine 12 controlled by an electronic control unit (ECU) 14 under engine cover 16. Engine 12 is housed generally in a powerhead 18 and is supported on a mid-section 20 configured for mounting on a transom 22 of a boat 24 in a known conventional manner. Engine 12 is coupled to transmit power to a propeller 26 to develop thrust and propel boat 24 in a desired direction. A lower unit 30 includes a gear case 32 having a bullet or torpedo section 34 formed therein and housing a propeller shaft 36 that extends rearwardly therefrom. Propeller 26 is driven by propeller shaft 36 and includes a number of fins 38 extending outwardly from a central hub 40 through which exhaust gas from engine 12 is discharged via mid-section 20. A skeg 42 depends vertically downwardly from torpedo section 34 to protect propeller fins 38 and encourage the efficient flow of outboard motor 10 through water.

A throttle body 50 (shown in phantom) is connected to engine 12 and has at least one opening 52 passing therethrough Opening 52 is often referred to as an air intake opening and allows combustion gas, generally air, to pass through throttle body 50 and into engine 12. Another opening 53, an idle air bypass, passes through throttle body 50 and provides an alternate path for combustion gas into and through throttle body 50. As will be described further below, opening 53 is constructed to provide combustion gas to engine 12 during idle and low speed operations.

Figure 2:
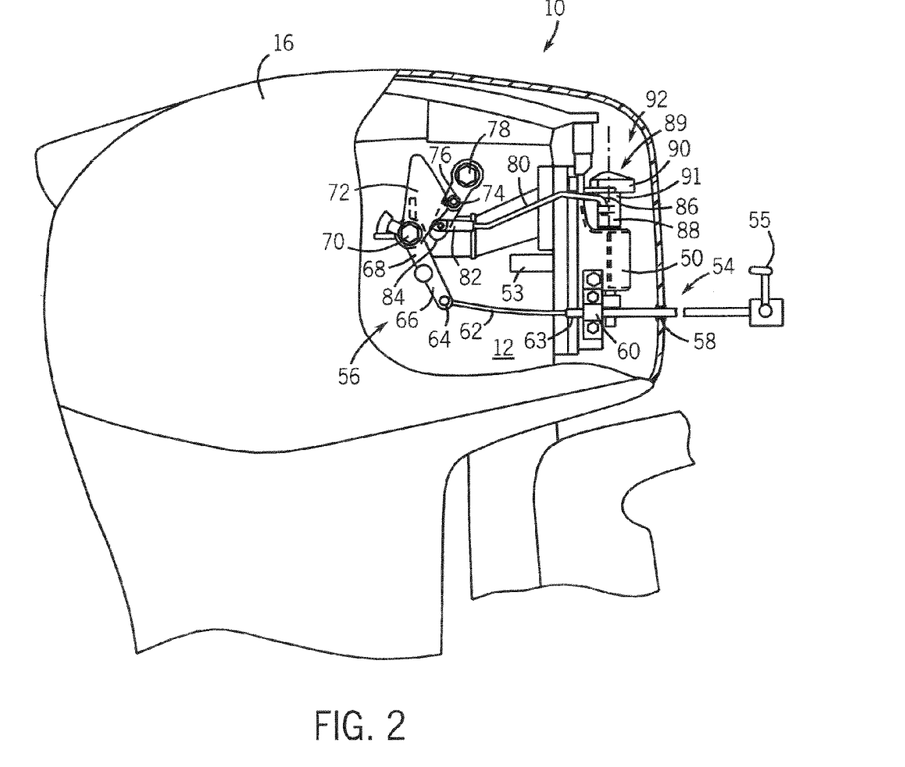
FIG. 2 is an elevational view of a portion of the outboard motor of FIG. 1 showing the throttle linkage and throttle assembly of the present invention.

FIG. 2 shows outboard motor 10 with a portion of engine cover 16 cut away. A throttle cable 54 connects a throttle actuator 55 to a throttle linkage assembly 56 so that throttle linkage assembly 56 is movable in response to operator manipulation of throttle actuator 55. Throttle cable 54 passes through an opening 58 formed in engine cover 16. A mounting bracket 60 secures throttle cable 54 to throttle body 50 and prevents movement therebetween. Throttle cable 54 has a cable 62 which extends from an end 63 thereof. Cable 62 extends and retracts from throttle cable 54 relative to mounting bracket 60 in response to operator manipulation of throttle actuator 55. An end 64 of cable 62 engages a first throttle link 66 of throttle linkage assembly 56. Cable end 64 is attached to a first arm 68 of first throttle link 66 so that movement of cable 62 results in rotation of first throttle link 66 about a pin or mounting bolt 70.

A second arm 72 of first throttle link 66 engages a pin 74 extending from a second throttle link 76 of throttle linkage assembly 56. Second throttle link 76 rotates about a pin 78 and has a third throttle link 80 attached thereto. A first end 82 of third throttle link 80 is connected to an end 84 of second throttle link 76. A second end 86 of third throttle link 80 is attached to an actuator 88 of a throttle assembly 92. During operation, as an operator advances throttle actuator 55, throttle cable 62 moves and rotates first throttle link 66 of throttle link assembly 56 about pin 70. Rotation of first throttle link 66 causes second arm 72 to engage pin 78 and thereby rotate second throttle link 76. Displacement of second throttle link 76 is translated to throttle assembly 92 via third throttle link 80 so that actuator 88 is coupled to throttle actuator 55. Such a linkage forms a throttle assembly that is highly responsive and sensitive to operator manipulation of a throttle actuator.

Referring to throttle assembly 92, a mount 89, preferably having a throttle position sensor (TPS) 90 inside, is connected proximate a first end 91 of actuator 88. The TPS 90 communicates the position of actuator 88 to the ECU of engine 12. In addition to the responsiveness of the throttle assembly, mounting TPS 90 about the actuator of the throttle assembly ensures that an ECU attached thereto is nearly instantaneously aware of operator manipulation of throttle actuator 55. Such a construction connects a throttle linkage assembly and throttle assembly with reduced play therebetween and allows an engine 12 so equipped to be highly responsive to actual throttle position.

Figure 3:
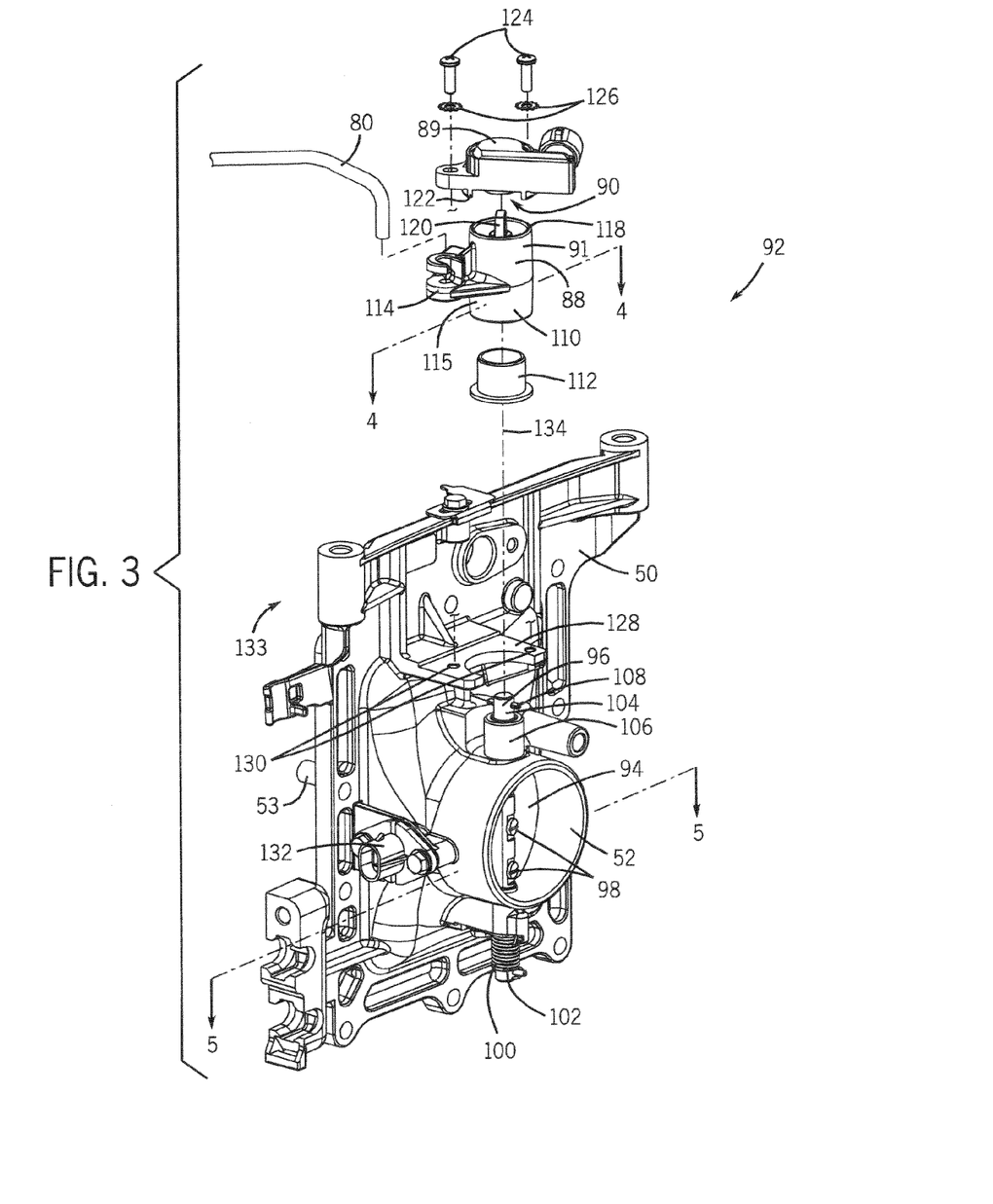
FIG. 3 is an exploded view of the throttle body and throttle assembly of FIG. 2.
Figure 5:
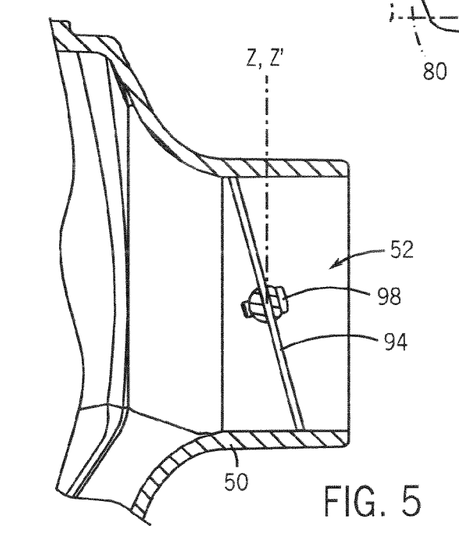
FIG. 5 is a cross-sectional view of a portion of the throttle assembly of FIG. 3 taken along line 5—5 and shows a closed throttle plate position.

FIG. 3 shows an exploded view of throttle assembly 92. Throttle body 50 is mounted to engine 12 with opening 52 in fluid communication with the combustion chambers of engine 12 and in general alignment with a front 51 of engine 12, as best viewed in FIG. 1. The front 55 of engine 12 is in linear alignment with an operator and passengers of watercraft 24. Referring back to FIG. 3, throttle plate 94 is rotatably positioned within opening 52 to regulate air flow through throttle body 50. During idle operation of engine 12, throttle plate 94 remains closed, as shown in FIGS. 3 and 5, and combustion gas is provided to engine 12 via an opening or idle air bypass 53. Opening 53 provides a path for combustion gas into engine 12 when throttle plate 94 prevents the passage of combustion gas through opening 52. Opening 53 is formed in throttle body 50 generally opposite air intake opening 52 and faces generally towards engine 12 and away from the operator and passengers of the watercraft or other recreational product.

Throttle plate 94 is secured to a throttle shaft 96 by a plurality of fasters 98 such that rotation of throttle shaft 96 results in rotation of throttle plate 94. A spring 100 is positioned about a first end 102 of throttle shaft 96 and biases throttle plate 94 to a closed position in opening 52, as shown in FIG. 3. A second end 104 of throttle shaft 96 extends through a mount structure 106 of throttle body 50. A pin 108, preferably a roll pin, extends through throttle shaft 96 and engages a second end 110 of actuator 88. A bushing 112 is constructed to fit about mount 106 and facilitates rotation of actuator 88 relative thereto.

Third throttle link 80 engages an arm 114 of actuator 88. Arm 114 is integrally formed with actuator 88 and extends from a body 115 thereof. By extending from body 115 of actuator 88, arm 114 allows for a generally linear translation of third throttle link 80 to rotate actuator 88. Body 115 has a generally cylindrical shape and extends from first end 91 of actuator 88 to second end 110. First end 91 of actuator 88 has a bearing surface 118 thereabout and an extension, or tab 120, extending therefrom. Tab 120 is constructed to engage throttle position sensor 90 located within mount 89 such that movement of actuator 88 results in a change of signal from throttle position sensor 90. Throttle position sensor 90 is within a mount 89 positioned about first end 91 of actuator 88. It is understood that in those applications where a throttle position sensor is mounted remotely relative to a throttle shaft that throttle position sensor 90 can be merely a molded mount attachable to the throttle body and constructed to support an end of the actuator therebetween.

A flange 122 of TPS mount 89 engages bearing surface 118 of actuator 88 and maximizes a frictionless rotational engagement therebetween. A plurality of fasteners 124 and corresponding washers 126 secure TPS mount 89 to throttle body 50 at a boss, or mounting flange 128, extending from throttle body 50. Mounting flange 128 includes a pair of holes 130 constructed to receive fasteners 124 therein to secure TPS mount 89 to throttle body 50 with actuator 88 disposed therebetween. Actuator 88 is free to rotate relative to throttle body 50 and TPS mount 89. As such, operator manipulation of throttle actuator 55, shown in FIG. 2, moves third throttle link 80 which in turn rotates actuator 88 relative to throttle body 50 and TPS mount 89.

A temperature probe 132 extends through throttle body 50 into air intake opening 52 on an engine side 133 of throttle plate 94 and is in electrical communication with ECU 14 shown in FIG. 2. Referring back to FIG. 3, temperature probe 132 is positioned in air intake opening 52 such that it does not interfere with rotation of throttle plate 94. Temperature probe 132 communicates to the ECU a temperature of combustion air provided to the engine to allow the ECU to more effectively control overall engine efficiency and, particularly, fuel combustion efficiency.

Actuator 88, TPS mount 89, bushing 112, and throttle shaft 96 all share a common axis 134. Common axis 134 is the axis of rotation of throttle shaft 96 to which throttle plate 94 is mounted. Although mounted about throttle shaft 96 and directly responsive to operator movement of throttle actuator 55, actuator 88 is partially rotatable about common axis 134 without affecting the position of throttle plate 94. That is, throttle plate 94 remains closed, as shown in FIG. 3, through a predetermined range of operator movement of throttle actuator 55, yet the RPM of the engine increases, as will be described in further detail below with respect to FIGS. 4–9.

Figure 4:
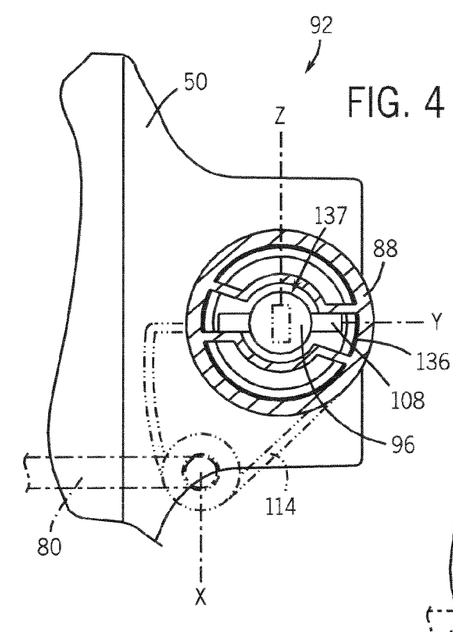
FIG. 4 is a cross-sectional view of a portion of the throttle assembly of FIG. 3 taken along line 4—4 and shows a throttle assembly idle position.

As shown in FIG. 4, when assembled, throttle shaft 96 and pin 108 of throttle assembly 92 are positioned in a recess 136 of actuator 88. Recess 136 has a bowtie shaped cross-section 137 that allows partial rotation of pin 108 and shaft 96 relative thereto. Although shown having a bowtie shaped cross-section it is understood that such a cross-section is merely by way of example and that other arrangements could be used to achieve the result of allowing actuator 88 to determinably engage and disengage from a driving relationship with throttle shaft 96, thereby providing a "deadband" in the throttle linkage. An example of such an arrangement would be a portion of the recess constructed to receive the throttle shaft and another portion of the recess constructed to receive a keying element such as one end of a pin extending from the shaft.

Figure 6:
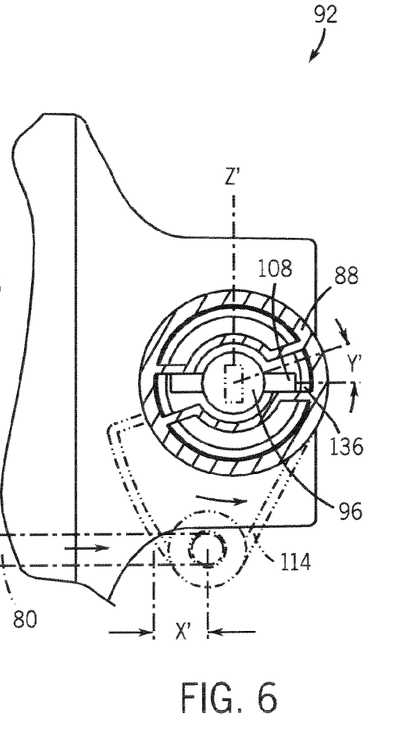
FIG. 6 is a view similar to FIG. 4 and shows the throttle assembly in a throttle assembly transition position.

The relation of actuator 88 to pin 108, as shown in FIG. 4, indicates an idle throttle position. Comparing FIG. 4 to FIG. 6, as an operator advances throttle actuator 55, third throttle link 80 is advanced a distance of X', as shown in FIG. 6. The relation of actuator 88 to pin 108, as shown in FIG. 6 indicates a transition throttle position. The transition throttle position is generally defined as the point during engine operation where the combustion process preferably transitions from a stratified combustion operation to a homogeneous combustion operation wherein stratified and homogenous define the type of combustion charge supplied to the engine, as is known in the art.

The displacement of third throttle link 80 distance X' results in rotation of actuator 88 but does not move pin 108 or throttle shaft 96. When third throttle link 80 is displaced distance X', actuator 88 rotates a distance Y'. In one embodiment, distance Y' is not more than 35 degrees and is preferably approximately 19 degrees. During operation, although an operator has advanced throttle actuator 55 and displaced third throttle link 80 a distance of X', as shown in comparing FIGS. 4 and 6, recess 136 prevents actuator 88 from displacing throttle shaft 98. As such, throttle plate 94 remains closed, as shown in FIG. 5, as actuator 88 is rotated relative thereto. Such a construction forms the deadband in the throttle assembly. One exemplary explanation of the deadband is where the throttle assembly receives an input command having a value of X' and throttle plate 94 does not experience a corresponding output. Such a construction allows throttle plate 94 to remain closed for a predetermined range of engine operation, not merely an engine idle condition.

Throttle plate 94 remains closed, as shown in FIG. 5, up to the transition of throttle position shown in FIG. 6. By maintaining throttle plate 94 closed until approximately the point the engine requires a homogenous combustion charge, a minimum amount of engine noise is allowed to exit the engine through air intake opening 52, while air bypass 53 is sized large enough to provide an adequate charge. Maintaining throttle plate 94 closed beyond engine idle speed reduces the overall amount of engine noise allowed to exit the engine through air intake opening 52.

Figure 7:
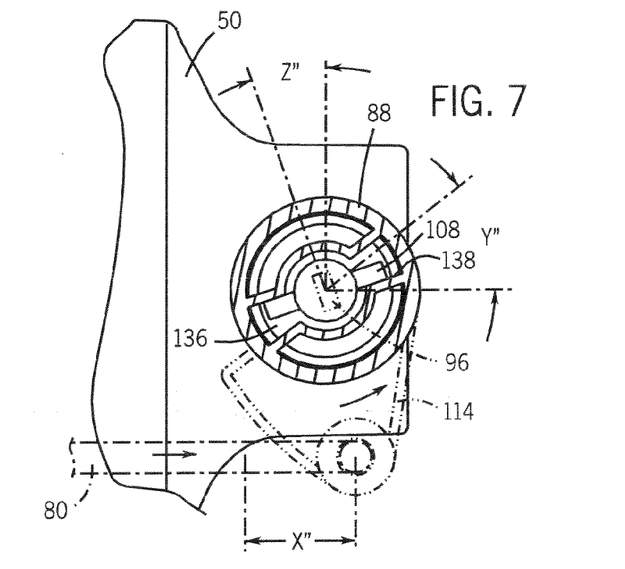
FIG. 7 is a view similar to FIGS. 4 and 5 and shows the throttle assembly rotated past the throttle assembly transition position.
Figure 8:
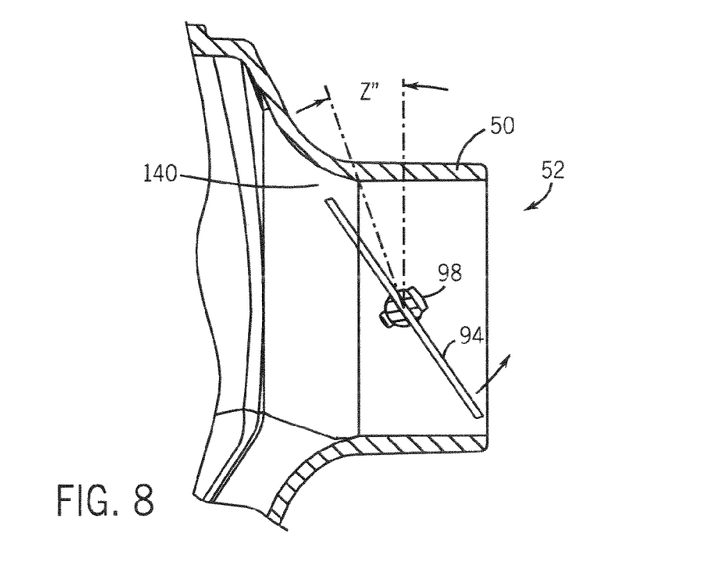
FIG. 8 is a view similar to FIG. 5 and shows the throttle assembly with the throttle plate rotated beyond the closed throttle plate position.

Comparing FIGS. 6 and 7, as an operator advances the throttle actuator beyond a distance X', shown in FIG. 6, any further increase in the position of the throttle actuator provides a corresponding rotation of throttle shaft 96 and opens throttle plate 94. As shown in FIG. 7, as third throttle link 80 is advanced a distance X", actuator 88 is rotated an angle of Y" while throttle shaft 96 rotates an angle of Z". The difference between Y" and Z" is equal to the amount of deadband engagement—distance Y', as shown in FIG. 6, between actuator 88 and throttle plate 94. Once third throttle link 80 is displaced a distance greater than X', as shown in FIG. 6, any further displacement of third throttle link 80 results in rotation of throttle shaft 96, as shown in FIG. 7. A leading edge 138 of recess 136 engages pin 108 and rotates throttle shaft 96. As leading edge 138 comes into contact with pin 108, as shown in FIGS. 7 and 8, throttle plate 94 rotates relative to opening 52 of throttle body 50. As shown in FIG. 8, when the throttle actuator is advanced beyond the transition throttle position, throttle plate 94 rotates to an open position, indicated by a gap 140 formed between throttle plate 94 and throttle body 50, allowing combustion gas to pass through opening 52.

Figure 9:
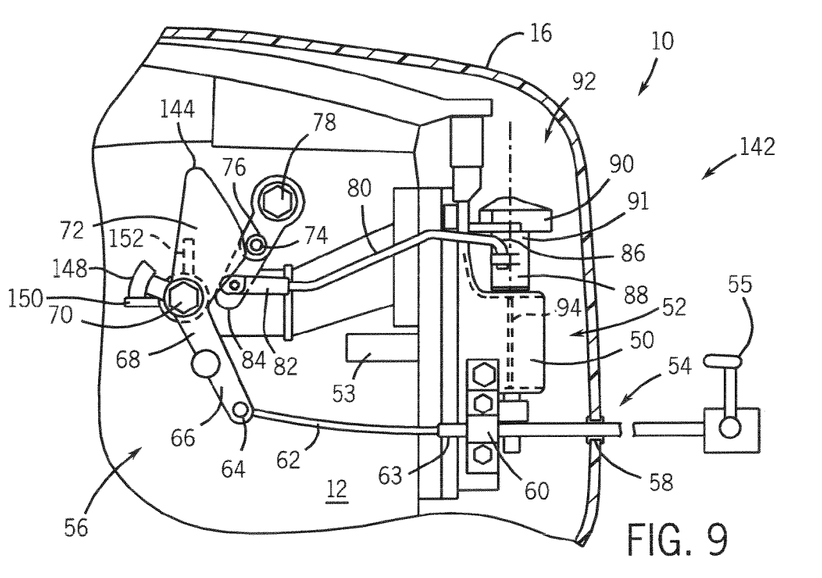
FIG. 9 is a detail view of the throttle assembly of FIG. 2 with the throttle actuator, throttle linkage assembly, and throttle assembly in an idle throttle position.

During idle operation of outboard motor 10, as shown in FIG. 9, when throttle actuator 55 is in an idle throttle position 142, throttle plate 94 is disposed generally across opening 52 thereby preventing the passage of combustion gas therethrough. Opening 53 provides combustion gas to pass through throttle body 50 thereby providing idle operation combustion gas to engine 12. Second arm 72 of first throttle link 66 includes a cam, or cam face 144 constructed to engage pin 74 of second throttle link 76.

Figure 10:
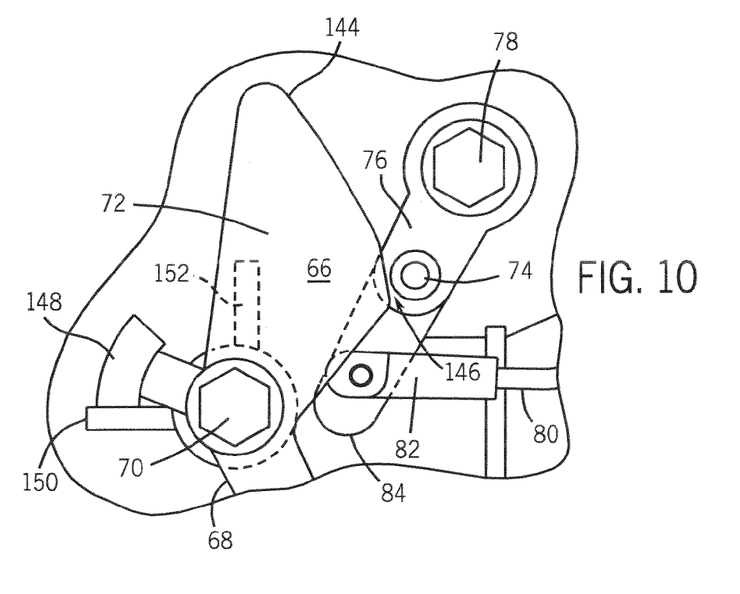
FIG. 10 is a detail view of the throttle linkage assembly in the idle throttle position as shown in FIG. 9.
Figure 12:
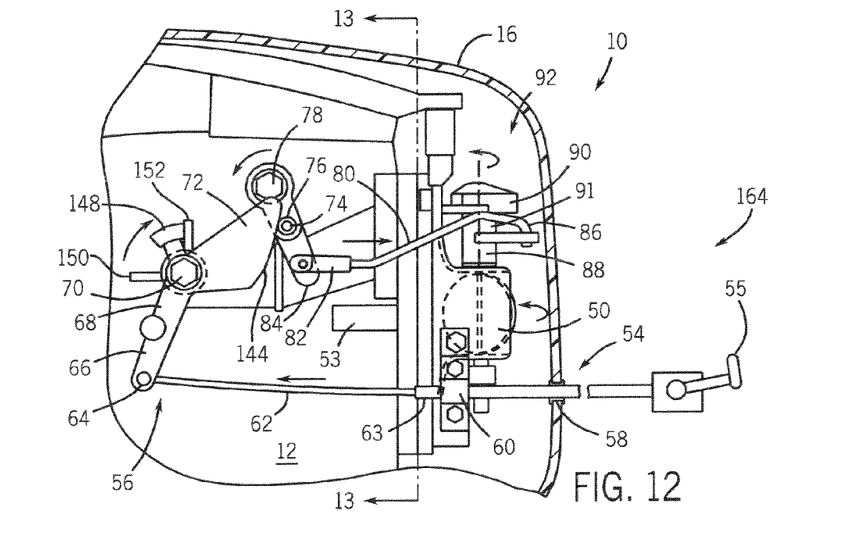
FIG. 12 is a detail view showing the throttle actuator, throttle linkage assembly, and throttle assembly of FIG. 9 advanced to a wide open throttle position.

As shown in FIG. 10, at idle operation of engine 12, a small gap 146 is formed between cam face 144 of first throttle link 66 and pin 78 of second throttle link 76. First throttle link 66 includes a tab, or third arm 148 integrally formed therewith. Third arm 148 is constructed to engage a first throttle stop 150 and a second throttle stop 152. Throttle stops 150, 152 are integrally formed with engine 12 and restrict the movement of throttle linkage 56 and define an idle throttle linkage position, as shown in FIGS. 9 and 10, and a wide open throttle linkage position, as shown in FIG. 12. Such a construction forms a throttle linkage assembly having no means of adjustment and wherein the range of rotation of each of the links of the throttle linkage assembly is permanently fixed.

Referring back to FIG. 9, with throttle actuator 55 in idle throttle position 142, third arm 148 of first throttle link 66 abuts first throttle stop 150 thereby permanently fixing the engine idle throttle linkage positions. Cam face 144 of second arm 72 of first throttle link 66 disengages from pin 74 with gap 146 therebetween. During idle throttle position 142, second throttle link 76, third throttle link 80, and actuator 88 are maintained in an idle position and mechanically separated from throttle actuator 55 by gap 146 between first and second throttle links 66, 76.

Figure 11:
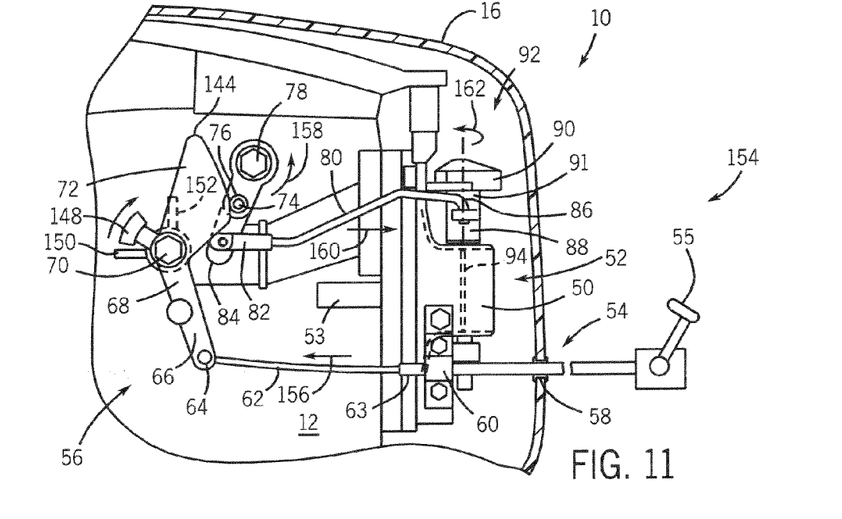
FIG. 11 is a detail view showing the throttle actuator, throttle linkage assembly, and throttle assembly of FIG. 9 advanced to an engine transition position.

As shown in FIG. 11, throttle actuator 55, throttle linkage assembly 56, throttle assembly 92 have been advanced to their respective engine transition positions 154. Throttle actuator 55 is shown advanced to a transition displacement, indicated by arrow 156, of throttle cable 62. Displacement 156 rotates first throttle link 66 such that third arm 148 disengages from first throttle stop 150 and rotates toward second throttle stop 152. Cam face 144 engages pin 74 of second throttle link 76 and slides there along rotating second throttle link about pin 78. Second throttle link 76 rotates in the direction of arrow 158 and displaces third throttle link 80 in the direction of arrow 160. Displacement 160 of third throttle link 80 rotates actuator 88 indicated generally by arrow 162.

Throttle position sensor 90 signals to the ECU the movement 162 of actuator 88. The ECU, in response to the signal from throttle position sensor 90, adjusts predetermined engine operating parameters. One of the engine parameters that is adjusted is the amount of fuel provided to the engine. The amount of fuel provided to the engine is increased in response to the throttle actuator adjustment. By adjust the amount of fuel provided to the engine at transition throttle position 154, the operating speed of the engine is increased. Even though the operating speed and the amount of fuel provided to the engine is increased, from idle throttle position 142, shown in FIG. 9, to transition throttle position 154 shown in FIG. 11, throttle plate 94 remains closed. This is accomplished because the air bypass 53 allows sufficient air induction into the engine via a second opening.

FIG. 12 shows a wide open throttle position 164. Throttle actuator 55 is fully advanced. Third arm 148 of first throttle link 66 is rotated into contact with second throttle stop 152. Second throttle stop 152 permanently fixes the position of throttle linkage assembly 56 and throttle assembly 92 during wide open throttle operation. Third throttle link 80 rotates actuator 88 beyond transition throttle position 154, as shown in FIG. 11, so that actuator 88 engages throttle plate 94. As shown in FIGS. 11 and 12, when the throttle actuator is advanced beyond transition throttle position 154 to wide open throttle position 164, throttle plate 94 rotates approximately 90 degrees relative to opening 52 thereby allowing combustion gas to pass therethrough. As engine 12 needs more combustion gas to mix with the fuel in order to transition from the stratified combustion stage to a homogeneous combustion stage, throttle plate 94 rotates in opening 52 to allow more combustion gas to pass therethrough. By maintaining the throttle plate closed across opening 52 during relatively low speed operation of engine 12, throttle assembly 92 reduces the amount of engine noise emitted toward an operator.

While many believe that two-stroke engines are generally not environmentally friendly engines, such preconceptions are misguided in light of contemporary two-stroke engines. Modern direct injected two-stroke engines and, in particular, Evinrude® outboard motors, are compliant with not only today's emission standards, but emission standards well into the future. However, since these engines are so advanced, they require trained technicians perform certain repairs and adjustments. As such, a significant portion of the ability to adjust these motors has been restricted to qualified personnel in an effort to ensure the future emission efficiency of the engines.

Figure 13:
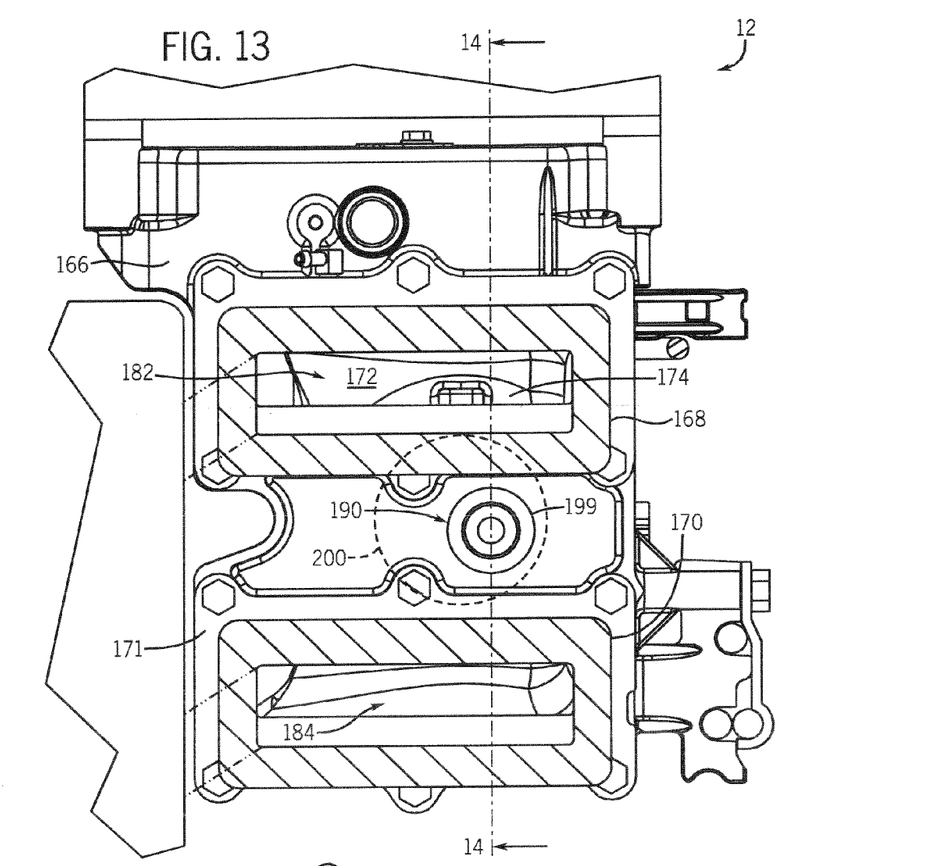
FIG. 13 is a cross-sectional view of a portion of the engine of the outboard motor of FIG. 1 taken along line 13—13 shown in FIG. 12.

FIG. 13 shows engine 12 along line 13—13 shown in FIG. 12. A block 166 of engine 12 has a first air intake tunnel 168 and a second air intake tunnel 170 in fluid communication through a throttle body adapter plate 171 communicating with the combustion chambers of the engine. It is noted that the previous figures only show one of these tunnels to maintain clarity of the figures. It is understood that the total number of intake tunnels could vary depending on engine configuration. As shown in FIG. 13, engine 12 has two such intake tunnels that correspond to the number of cylinders of engine 12. Tunnels 168, 170 are fluidly connected to a crankcase cavity 172 of engine 12. A crankshaft 174 is rotatably mounted within crankcase cavity 172 and connected to the pistons of engine 12.

Figure 14:
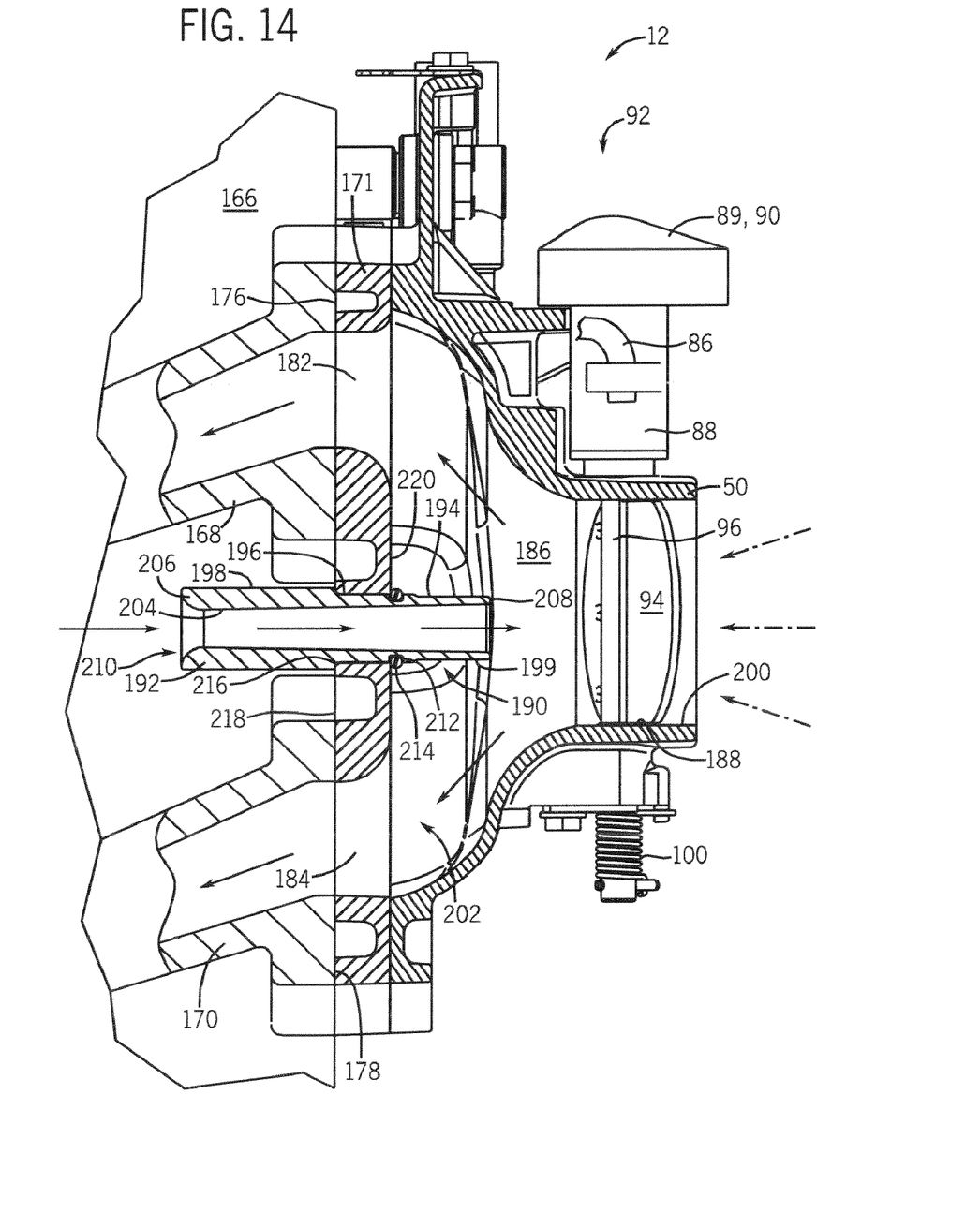
FIG. 14 is cross-sectional view of the engine of FIG. 13 taken along line 14—14.

Tunnels 168, 170 are each sealingly connected to adapter plate 171. Adapter plate 171 has a first port 182 and a second port 184 that allow fluid communication through adapter plate 171 into crankcase cavity 172 via first tunnels 168 and 170. As shown in FIG. 14, ports 182, 184 of adapter plate 171 fluidly connect a chamber 186 of throttle body 50 to tunnels 168 and 170 of engine block 166. Although shown as separate from throttle body 50, it is understood that throttle body 50 could be formed to include the structure of adapter plate 171. Adapter plate 171 allows for increased versatility and interchangeability of throttle body 50 with different engine intake tunnel orientations. That is, rather than modify throttle body 50 to be connectable to multiple different engine air intake tunnels, each respective engine orientation could be equipped with an adapter plate that interacts with throttle body 50.

Throttle body 50 has a main passage, or first inlet 188, with throttle plate 94 disposed therein. The position of throttle plate 94 relative to first inlet 188 controls the cross-sectional size of first inlet 188 and controls the amount of combustion gas allowed to pass therethrough. As throttle plate 94 rotates to an open position from the generally transverse position shown in FIG. 14, increased amount of combustion gas is allowed to pass through first inlet 188 into chamber 186. Throttle body 50 has a second inlet 190 which passes from chamber 186 to atmosphere. When throttle plate 94 is in the closed position, as shown in FIG. 14, combustion air enters chamber 186 through second inlet 190. While engine 12 idles and runs at low speed, up to the transition engine speed, second inlet 190 supplies a majority of the combustion air to engine 12. That is, as actuator 88 is rotated from the idle position to the transition position, as discussed above with respect to FIGS. 9 through 11, throttle plate 94 causes first inlet 188 to remain closed and combustion gas for engine 12 must be drawn through second inlet 190.

A tube 192 is disposed in second inlet 190 and has a first section 194 that extends into chamber 186, a second section 196 that engages adapter plate 171 of throttle body 50, and a third section 198 which extends toward engine 12. As best viewed in FIG. 13, a perimeter 199 of second inlet 190 is within a perimeter 200 of first inlet 188. Returning to FIG. 14, second inlet 190 extends through a side 202 of throttle body 50 generally opposite first inlet 188 and directed generally toward engine 12. Any sound that may travel through second inlet 192 is directed toward engine 12 and generally away from an operator of a watercraft.

Tube 192 has an inside surface 204 with a fixed cross-section that varies from an inlet end 206 to a outlet end 208 of tube 192 with outlet end 208 disposed in chamber 186 of throttle body 50. The cross-sectional shape of tube 192 forms what is commonly referred to as a Venturi 210. Venturi 210 is evident in the reduced cross-section of the passage through tube 186 near inlet end 206 which tapers to a wider cross-section at outlet end 208. Venturi 210 allows the greatest amount of air flow through tube 192 with a reduced likelihood of generating a whistle because of the flow therethrough. That is, venturi 210 of tube 192 reduces the likelihood of an intake whistle being generated during the operation of engine 12 while opening chamber 186 directly and unobstructedly to atmosphere.

An annular groove 212 is formed in second section 196 of tube 192 and receives a ring 214 therein and a shoulder 216 is formed between second section 196 and third section 198. Shoulder 216 engages an engine side 218 of adapter plate 171 whereas ring 214 engages a chamber side 220 of adapter 180. Such an orientation secures tube 192 in second inlet 190 of adapter plate 171 of throttle body 50. Alternatively, it is understood that tube 192, shown in FIG. 15, could be press fit into an opening formed in the throttle body 50 or be integrally formed with either adapter plate 171 or throttle body 50.

Figure 15:
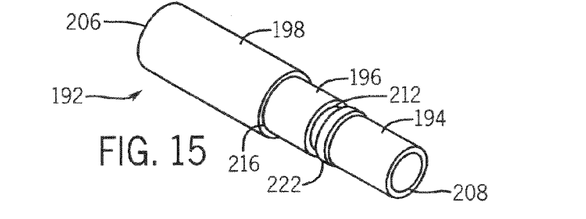
FIG. 15 is a perspective view of the idle air bypass tube of FIG. 14.

As shown in FIG. 15, first section 194 extends from outlet end 208 to a lip 222 formed between groove 212 and first section 194. Second section 196 extends from groove 212 to shoulder 216 and has an outer diameter that is constructed to sealingly engage second inlet 190 of throttle body 50 as shown in FIG. 14. Returning to FIG. 15, third section 198 of tube 192 extends between shoulder 216 and inlet end 206 of tube 192. It is understood that the complex shape of tube 192 as described above is merely exemplary of a combustion air idle bypass tube according to a preferred embodiment of the present invention. It is understood that many variations can be made to the specific shape of tube 192 without deviating from the nature of the invention and are within the scope of the appending claims.

In accordance with one embodiment of the present invention, an air intake assembly for an internal combustion engine includes a first inlet, a second inlet, and an outlet formed in a throttle body. A throttle plate is rotatably positioned in the first inlet and the second inlet is open to atmosphere.

According to another embodiment of the present invention, a throttle body assembly has a chamber configured to be in fluid communication with an internal combustion engine formed in a housing. The housing has a throttle passage in communication with the chamber. A throttle plate is positioned in the throttle passage and configured to interrupt communication through the throttle passage. A bypass passage is formed in the housing and has an inlet facing towards the internal combustion engine and an outlet located in the chamber. The bypass passage communicates atmosphere to the chamber.

According to a further embodiment of the present invention, an internal combustion engine includes an engine having at least one cylinder formed therein. A throttle body is attached to the engine and has a first passage and a second passage. The first passage has a valve therein and is configured to have a variable cross-section. The second passage is vented to atmosphere and has a fixed cross-section.

In accordance with yet another embodiment of the present invention, a method of manufacturing an engine includes the steps of forming an air inlet opening in one side of a throttle body, positioning a solid surface throttle plate in the air inlet opening, and forming a bypass to atmosphere in another side of the throttle body.

The present invention has been described in terms of the preferred embodiment, and it is recognized that equivalents, alternatives, and modifications, aside from those expressly stated, are possible and within the scope of the appending claims.

What is claimed is:

1. An internal combustion engine comprising:
   an engine having at least one cylinder formed therein;
   a throttle body attached to the engine;
   a first passage having a valve therein and configured to have a variable cross-section; and
   a second passage vented to atmosphere and having a fixed cross-section, the second passage including a tube and the fixed cross-section varies along a length of the tube, the tube having a first section with an outer diameter that is less than a diameter of the second passage, a second section having an outer diameter that substantially matches the diameter of the second passage, and a third section having an outer diameter that is larger than the diameter of the second passage.

2. The internal combustion engine of claim 1 further comprising an annular groove formed in the second section.

3. The internal combustion engine of claim 1 wherein the first section passes into an inner chamber of the throttle body.

4. The internal combustion engine of claim 1 wherein the valve is a throttle plate rotatably positioned in the first passage.

5. The internal combustion engine of claim 4 wherein the throttle plate prevents a flow of combustion gas through the first passage for a predetermined displacement of a throttle actuator.

6. The internal combustion engine of claim 4 wherein the throttle plate prevents engine noise from exiting the engine along the first passage for a predetermined range of engine operation.

7. The internal combustion engine of claim 1 wherein the second passage provides adequate combustion gas to the engine for a predetermined range of engine speed.

8. The internal combustion engine of claim 1 further comprising a throttle linkage attached to the throttle body and connected to the valve, the throttle linkage including a plurality of links, each link having a permanently fixed range of rotation.

9. A throttle body for an engine comprising:
   a housing;
   a chamber located in the housing;
   a first inlet in fluid communication with a first side of the chamber;
   a throttle plate located in the first inlet;

a second inlet in fluid communication with a second side of the chamber opposite the first side and having an opening into the chamber facing the throttle valve when the throttle valve is closed; and an outlet in fluid communication with the chamber.

10. The throttle body of claim 9, wherein the second inlet comprises an idle air bypass tube, the idle air bypass tube having an inlet end and an outlet end.

11. The throttle body of claim 10, wherein the outlet end of the idle air bypass tube extends inside the chamber.

12. The throttle body of claim 11, wherein the inlet end of the idle air bypass tube extends away from the housing.

13. The throttle body of claim 10, wherein the inlet end of the idle air bypass tube extends away from the housing.

14. The throttle body of claim 9, wherein the outlet comprises two outlets.

15. The throttle body of claim 14, wherein the second inlet is located between the two outlets.

16. The throttle body of claim 14, wherein the two outlets are in fluid communication with the second side of the chamber.

17. The throttle body of claim 9, wherein the outlet is in fluid communication with the second side of the chamber.

18. The throttle body of claim 9, wherein the first inlet has a first longitudinal axis, and the second inlet has a second longitudinal axis parallel to the first longitudinal axis.

19. The throttle body of claim 18, wherein the second longitudinal axis is offset from the first longitudinal axis.

20. The throttle body of claim 9, wherein the first inlet has a larger diameter than the second inlet.

21. The throttle body of claim 20, wherein the second inlet has a longitudinal axis which extends through a perimeter of the first inlet.

22. The throttle body of claim 9, further comprising a throttle shaft connected to the throttle plate and rotationally mounted within the first inlet.

23. An internal combustion engine comprising:
an engine body;
at least one cylinder formed in the engine body;
a throttle body attached to the engine body and having a first and a second throttle body inlet;
a chamber located in the throttle body;
the first throttle body inlet facing away from the engine and in fluid communication with the chamber;
the second throttle body inlet having an opening to an ambient environment facing towards the engine body and in fluid communication with the chamber;
a throttle plate located in the first throttle body inlet; and
a throttle body outlet fluidly communicating the chamber with the engine body.

24. The internal combustion engine of claim 23, wherein the first throttle body inlet is on a side of the chamber opposite a side of the chamber where the second throttle body inlet is located.

25. The internal combustion engine of claim 23, wherein the second throttle body inlet comprises an idle air bypass tube, the idle air bypass tube having an inlet end and an outlet end.

26. The internal combustion engine of claim 25, wherein the outlet end of the idle air bypass tube extends inside the chamber.

27. The internal combustion engine of claim 26, wherein the inlet end of the idle air bypass tube extends towards the engine body.

28. The internal combustion engine of claim 25, wherein the inlet end of the idle air bypass tube extends away from the housing.

29. The internal combustion engine of claim 23, wherein the throttle body outlet comprises two throttle body outlets.

30. The internal combustion engine of claim 29, wherein the second throttle body inlet is located between the two throttle body outlets.

31. The internal combustion engine of claim 29, wherein the two throttle body outlets face towards the engine body.

32. The internal combustion engine of claim 23, wherein the throttle body outlet faces towards the engine body.

33. The internal combustion engine of claim 23, wherein the first throttle body inlet has a first longitudinal axis, and the second throttle body inlet has a second longitudinal axis parallel to the first longitudinal axis.

34. The internal combustion engine of claim 33, wherein the second longitudinal axis is offset from the first longitudinal axis.

35. The internal combustion engine of claim 23, wherein the first throttle body inlet has a larger diameter than the second throttle body inlet.

36. The internal combustion engine of claim 35, wherein the second throttle body inlet has a longitudinal axis which extends through a perimeter of the first throttle body inlet.

37. The internal combustion engine of claim 23 further comprising a throttle shaft connected to the throttle plate and rotationally mounted within the first throttle body inlet.

38. An internal combustion engine assembly, comprising:
an internal combustion engine;
a throttle body associated with the engine, the throttle body having
a first air passageway for supplying air to the engine, the first air passageway having a throttle valve therein; and
a second air passageway for supplying air to the engine, the second air passageway having an inlet facing the engine and in communication with an ambient environment other than via the first passageway, and an outlet in communication with the first passageway downstream of the throttle valve.

39. The internal combustion engine of claim 38, wherein the outlet of the second air passageway is on a side of the throttle body opposite the side of the throttle body where the first air passageway is located.

40. The internal combustion engine of claim 38, wherein the outlet of the second air passageway extends inside the first passageway.

41. The internal combustion engine of claim 38, the throttle body further comprising first and second outlets.

42. The internal combustion engine of claim 41, wherein the second air passageway is located between the first and second throttle body outlets.

43. The internal combustion engine of claim 38, wherein the first air passageway has a first longitudinal axis, and the second air passageway has a second longitudinal axis parallel to the first longitudinal axis.

44. The internal combustion engine of claim 43, wherein the second longitudinal axis is offset from the first longitudinal axis.

45. The internal combustion engine of claim 38, wherein the first air passageway has a larger diameter than the second air passageway.

46. The internal combustion engine of claim 45, wherein the second air passageway has a longitudinal axis which extends through a perimeter of the first air passageway.

* * * * *